INVENTOR.
TELFORD L. SMITH
PAUL G. DUNMIRE
BY
ATTORNEY

Aug. 25, 1959 T. L. SMITH ET AL 2,901,274
SLEEVE TYPE PIPE COUPLING HAVING SHEET METAL FOLLOWERS
Filed April 9, 1956 2 Sheets-Sheet 2
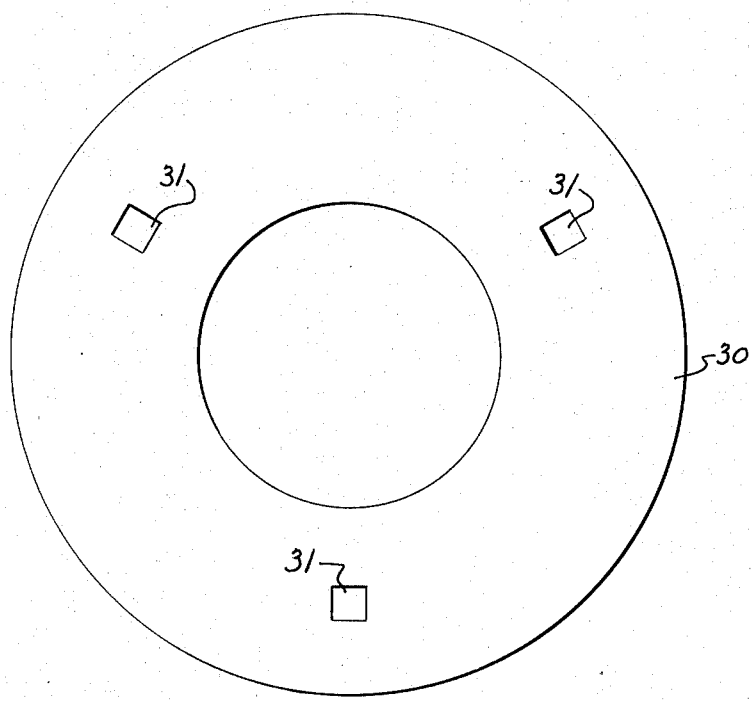
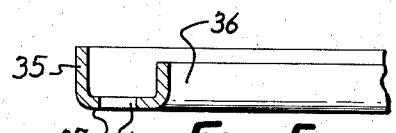
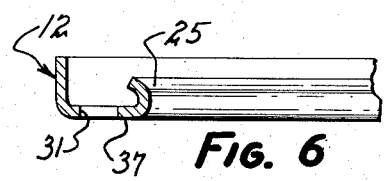
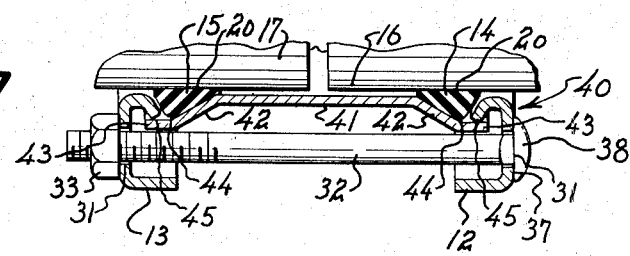
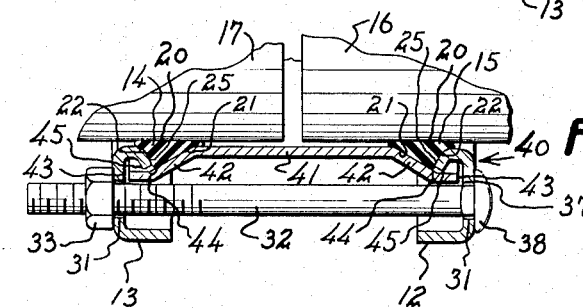
INVENTOR.
TELFORD L. SMITH
PAUL G. DUNMIRE
BY
ATTORNEY

United States Patent Office 2,901,274
Patented Aug. 25, 1959

2,901,274

SLEEVE TYPE PIPE COUPLING HAVING SHEET METAL FOLLOWERS

Telford L. Smith, South San Francisco, and Paul G. Dunmire, Burlingame, Calif.

Application April 9, 1956, Serial No. 577,155

2 Claims. (Cl. 285—341)

This invention relates to an improved pipe coupling, particularly to that type of coupling employing a sleeve against which a pair of bolt-tightened followers compress a pair of gaskets.

The present invention solves the problem in the pipe-coupling field of providing an inexpensive and eminently practical leak-proof coupling for smooth-end cylindrical pipe. Heretofore the best followers utilized in this type of coupling were frequently made of heavy castings, in spite of their being much more expensive than pressed-steel parts would be, because no fully satisfactory way was known of making a practical coupling from pressed steel. The best pressed-steel followers heretofore in use had to be made from two separate pieces welded together—an expensive procedure—and the results obtained from these couplings were far less satisfactory than those obtained from couplers with cast followers. The present invention has solved this problem by providing a one-piece follower made from sheet steel by a die-forming process. This new follower has great strength, due to its unique shape; in fact, its strength is greater than that of any comparable coupling, enabling the application of high pressures to the sealing gasket. Moreover, the sleeve-follower-gasket combination obtains an unusually high sealing pressure in proportion to the applied mechanical pressure. The cost of producing this new coupling is low, so that it is relatively inexpensive as compared with prior art devices, yet it gives better sealing action due to its novel shape. In addition it is very easy to install.

Thus, one object of the invention is to provide an improved coupling follower that is die-formed from sheet steel.

Another object is to provide a coupling which is simpler to install and less expensive to manufacture than those heretofore in use and yet will obtain better sealing action.

Another object of the invention is to provide a very tight sealing action which may be utilized with pipe conducting natural gas, gasoline, and other materials where leakage can not be tolerated.

The invention forms the follower with a tapered seat and employs a gasket having two beveled surfaces, one of which is engaged by the follower and the other by the sleeve, the remaining surface of the gasket being the axial one which seals against the pipe wall.

Other objects of the invention will appear from the following description of preferred forms thereof.

Figs. 4, 5, and 6 are views showing how the follower is formed in die presses.

Fig. 4 is a plan view of the flat blank.

Fig. 5 is a fragmentary view in section of a portion of the cylindrically flanged blank.

Fig. 6 is a view like Fig. 5 of the completed follower.

Figure 2:
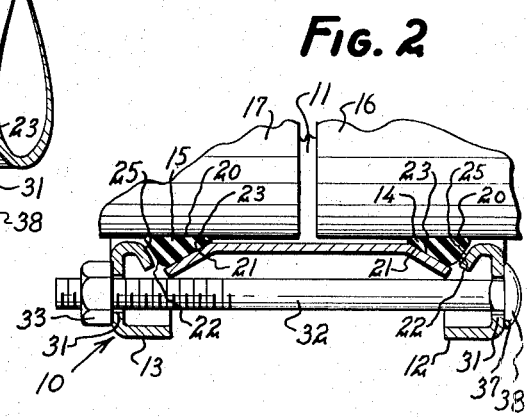
Fig. 2 is a fragmentary view similar to the lower portion of Fig. 1 showing the coupling after assembly but before the bolts have been tightened.
Figure 3:
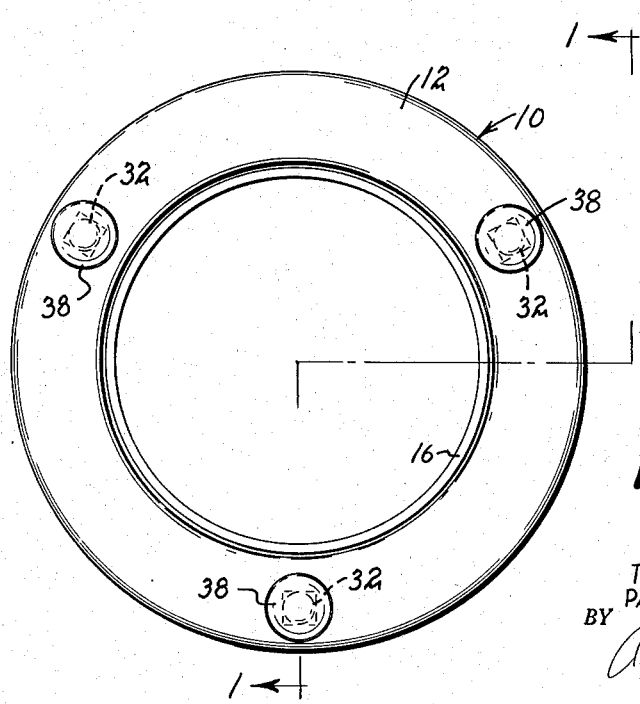
Fig. 3 is a view in end elevation looking from the outside end of one of the followers.

Fig. 7 is a view similar to Fig. 2 showing one end of a modified form of the invention before tightening.

Fig. 8 is a view like Fig. 7 with the coupling tightened.

Figure 1:
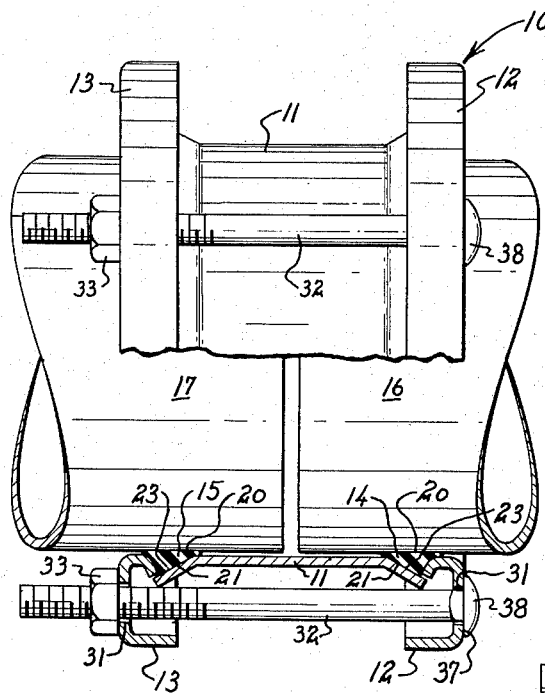
Fig. 1 is a view in side elevation and partly in section of a coupling employing the principles of the invention installed on a pair of pipes, the pipes being broken off to conserve space. The section is taken along the line 1—1 in Fig. 3.

The coupling 10 shown in Figs. 1 and 2 comprises a sleeve 11 and an identical pair of followers 12 and 13 which compress an identical pair of annular gaskets 14 and 15 against the sleeve 11 so as to seal the gasket against the peripheries of a pair of smooth-end pipes 16 and 17 that are to be coupled together. As the drawings show, the gaskets 14 and 15 have an inner axial surface 20 and a pair of oppositely sloped or beveled surfaces 21 and 22, so that its appearance, in cross-section, is substantially that of a triangle with rounded corners. The gasket surface 21 engages the beveled surface 23 which is formed as an integral part of the pressed steel sleeve 11, the sleeve 11 having a substantially constant thickness at all portions. The sleeve 11 obviously can be formed from sheet steel, and it will now be shown how the followers 12 and 13 can also be formed from sheet steel so as to provide a tapered seat 25 adapted to engage the gasket tapered surface 22.

As Fig. 4 shows, a blank 30 from which the follower 12 may be formed is an annular flat disc with bolt holes 31 punched therefrom, the holes 31 preferably being square, so that carriage bolts 32 can be inserted from one follower 12 and held and tightened by nuts 33 against the other follower 13.

The next step (Fig. 5) is to form (1) a uniform cylindrical flange 35 at the outer edge; this flange gives the follower 12 or 13 great rigidity; and (2) an inner annular axial flange 36. The flanges 35 and 36 may be formed simultaneously in a single operation. Then in the next operation (Fig. 7) the inner flange 36 is flared to form the conically tapered seat 25. This structure not only results in the correctly shaped seat 25; it also results in strengthening the follower 12 and increasing its rigidity, so that there will be no tendency for the follower 12 to bend, even though it is made of sheet steel.

Upon installation, the coupler 10, loosely assembled, is placed around the ends of the pipes 16, 17, with the gaskets 14 and 15 placed between the tapered seats 23 of the sleeve 11 and the tapered seats 25 of the follower 12, 13. The heads 38 of the bolt 22 bear against the outer face of the radial portion 37 of one follower 12, while the nuts 33 bear against the outer radial face of the opposite follower 13. When the nuts 33 are tightened, the followers 12, 13 are urged in toward each other, and the gaskets 14, 15 are compressed between the two pairs of tapered seats 23, 25. The pressure on the gasket faces 21 and 22 tends to force the gasket radially inwardly, tightening its face 20 against the walls of the pipes 16, 17. Due to the outer axial flange 35 and to the tapered inner flange 25, the follower 12, 13 can withstand great pressure without bending; in fact, water or other liquid carried through the pipes can exert more than 1,000 pounds per square inch pressure without breaking the seal.

Fig. 7 shows a modified form of coupler 40 having the same followers 12 and 13 and gaskets 14 and 15, but with a slightly different sleeve 41. In this novel sleeve 41 end portions 43 extend axially beyond the tapered seats 42. These end portions 43 lie radially just beyond the outer perimeter 44 of the gaskets 14, 15 and also just beyond the outer perimeter 45 of the followers' sloping portion 25. This structure increases the tightness of the seal by preventing any pinching of the gasket 14, 15, thereby insuring a radially inward force on the gaskets 14 and 15.

The outer perimeter 45 of the followers' sloping portion 25 acts as a guide ring to center the sleeve 41 around the pipe, due to the overlap of the portion 43. Also, the portions 43, sloping portion 25, and tapered seats 42 form a closed cavity that completely contains the gaskets 14 and 15.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. In a coupling for cylindrical piping, said coupling having a sleeve of substantially constant thickness whose ends flare outwardly at a constant angle, the combination of a pair of followers at each end, each with a sloping axially inner face with its radially outer portion nearer the opposite follower than its radially inner portion but radially short of said sleeve ends; a pair of unitary gaskets, each having a plain cylindrical pipe-engaging face, a constant-sloping sleeve-end-engaging face radially short of said sleeve end, a constant-sloping follower-engaging face radially short of said follower, the sleeve-end-engaging face of said gasket extending radially outwardly beyond said follower-engaging face, and a gently sloping generally axial face joining the outer ends of said sleeve-end-engaging face and said follower-engaging face, for resolving pressure radially inwardly and toward said follower face when said coupling is tightened, the followers each being die-formed of sheet metal stock of constant thickness to provide a radially extending wall portion having an annular opening, the wall of the opening closely surrounding the piping and having a reentrant bend forming a frusto-conical flange portion of said metal stock extending integrally and at a substantially complementary angle to the follower-engaging face of the gasket from the periphery of the opening to form the sloping axially inner face, the radially outer periphery of the wall having an integral flange extending axially toward the other of said followers, and means for urging said followers toward each other so that said sleeve ends ride over said gasket and said followers' sloping portion without pinching said gasket, said gasket when compressed by the follower assuming practically a triangular section under full compression, without tending to squeeze up in between said follower and said sleeve.

2. In a coupling in accordance with claim 1, in which the outwardly flared ends of the sleeve terminate in axially extending terminal portions.

References Cited in the file of this patent

UNITED STATES PATENTS

| | | |
|---|---|---|
| 644,393 | Albree | Feb. 27, 1900 |
| 675,730 | Hammon | June 4, 1901 |
| 1,004,004 | Farrell | Sept. 26, 1911 |
| 1,189,147 | McCloy | June 27, 1916 |
| 1,671,789 | Smith | May 29, 1928 |
| 1,853,168 | Murphy | Apr. 12, 1932 |
| 2,853,318 | Smith | Sept. 23, 1958 |